United States Patent

[11] 3,559,824

| [72] | Inventors | Gabriel Joseph Benac;<br>Rene Louis Bernard Benac, Berdoues,<br>Gers, France |
|---|---|---|
| [21] | Appl. No. | 780,048 |
| [22] | Filed | Nov. 29, 1968 |
| [45] | Patented | Feb. 2, 1971 |
| [32] | Priority | Mar. 4, 1968 |
| [33] | | France |
| [31] | | 142,305 |

[54] STOCKING HOPPER FOR A TRACTOR
1 Claim, 4 Drawing Figs.

[52] U.S. Cl............................................. 214/42,
214/509; 298/10
[51] Int. Cl........................................B65g 67/22,
B60p 1/04
[50] Field of Search............................................ 214/42,
42A, 8—69, 41, 501, 508, 509, 450; 298/10

[56] References Cited
UNITED STATES PATENTS

| 2,234,599 | 3/1941 | Johnston | (298/10)UX |
| 2,628,729 | 2/1953 | Borchers | 214/42(A) |
| 2,957,726 | 10/1960 | Fergason | 298/10X |

*Primary Examiner*—Robert G. Sheridan
*Attorney*—Sherman Levy

ABSTRACT: The invention relates to a stocking hopper, in particular for a tractor, including a chassis support bearing the hopper, said hopper being allowed to revolve on the chassis along an axis located close to one of the side edges of the hopper and close to the loading door of the hopper, which allows the tilting of the hopper at a sufficiently high level, though the hopper is not at a high level in loading position.

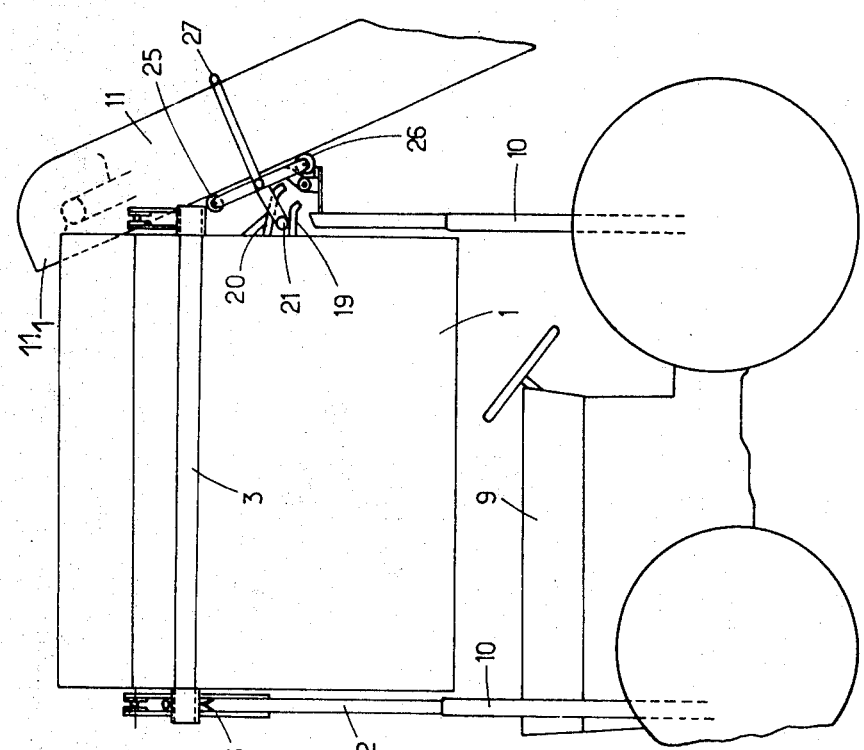
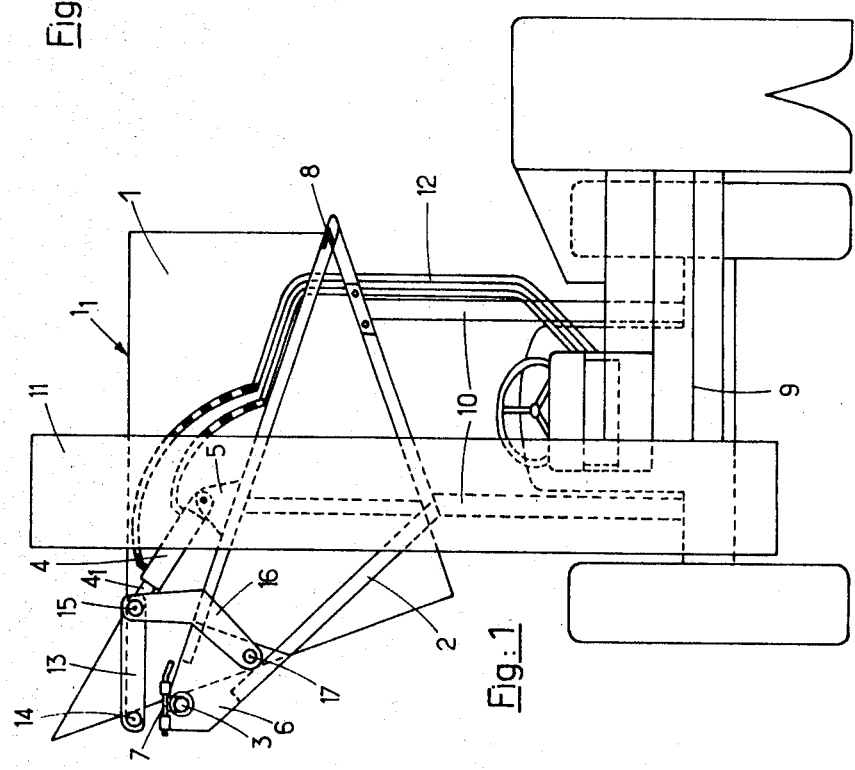

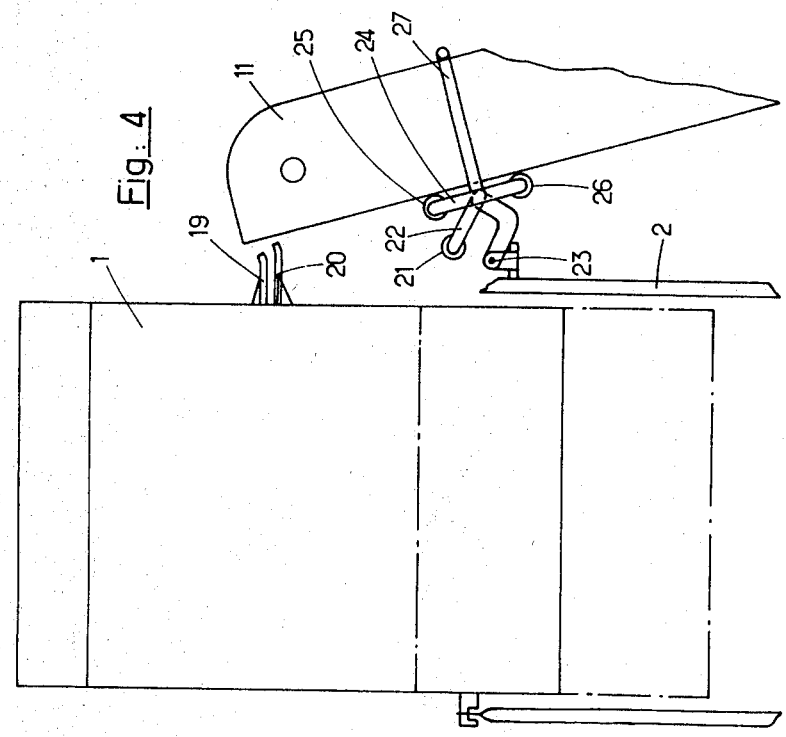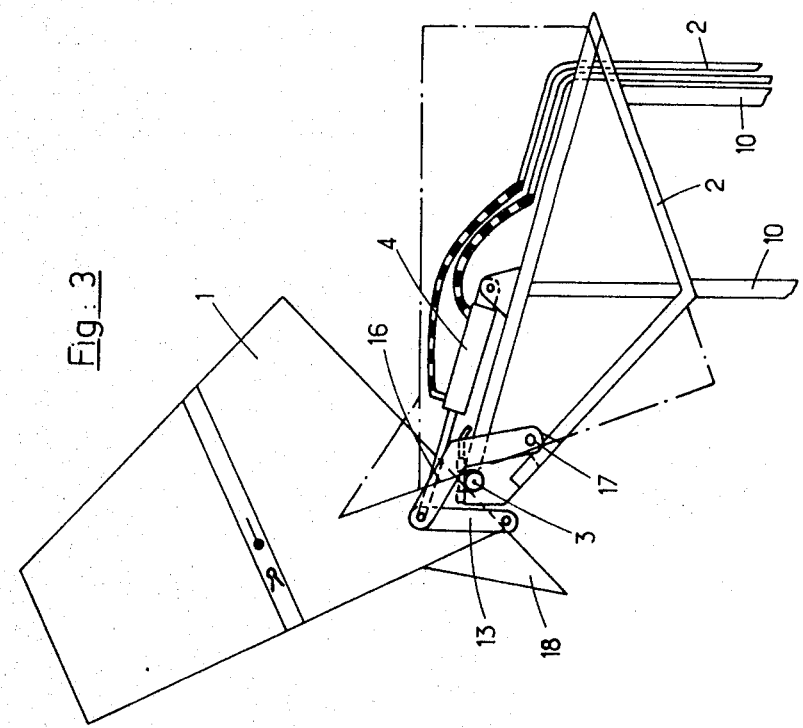

3,559,824

STOCKING HOPPER FOR A TRACTOR

Hoppers fitted on farm tractors which are designed to be filled with products gathered by a harvesting machine coupled with a tractor are already well known.

These hoppers allow the conveyance of the harvested products up to the border or edge of the fields where they are loaded on a tip or on a trailer of large size parked on a harder ground.

Some of these hoppers include, for this purpose, a side door through which the harvested products are tilted laterally.

In this case, the emptying is made by gravity, the door serving generally as an extension part of the floor of the hopper so as to convey the products as far away as possible towards the center of the containing unit, such as a trailer or tilt.

The disadvantage of hoppers of this type lies in the fact that they must be placed on the tractor at a high level, especially when the products are to be tilted in a tip placed over a truck, which, as a result, breaks up the equilibrium of the tractor because of the raising of the center of gravity and involves the use of very long elevators to convey the products from the machine up to the hopper.

Well known also are hoppers the emptying of which is made by the rocking of the hopper towards the front of the tractor, which involves first mechanical complications arising from the side travel required to bring the hopper from its working site right to the pivoting point at the front edge of the tractor, besides, due to the fact the tractor must be placed in front of the containing unit, this obliges the driver to back each time before starting again.

The object of the invention is to overcome these inconveniences and relates, for this purpose, to a stocking hopper for tractors, particularly, featured by a support chassis bearing the hopper, said hopper being assembled with a pivoting system on the chassis, along an axis located close to one of the side edges of the hopper and close to the loading door of said hopper, which allows the hopper to tilt at a sufficient high level though the hopper is not at a too high level in loading position.

A hopper and a tractor according to the invention are shown on the attached drawings, on which:

FIG. 1 is a rear view of a tractor and a hopper assembly in working position;

FIG. 2 is a view of FIG. 1 from the left;

FIG. 3 is a partial view showing the hopper in tilted position; and

FIG. 4 is a view of FIG. 3 from the left.

The stocking hopper according to the invention is made of a sheet iron container 1 provided with a door $1_1$ at its upper part for the loading and the emptying.

Hopper 1 is placed on a tubular chassis 2 through a shaft or pivoting axis 3 which allows the tilting of the hopper.

Tilting axis 3 is set along the sidewall of the hopper and close to the upper door $1_1$, while a jack 4 revolving on chassis through a binding iron 5 allows the automatic discharge of the products contained in the hopper.

Jack 4 is a single-acting or double-acting jack and, in the case of a single-acting jack, the return to the loading position is carried out by means of a release spring not shown on the FIG.

Pivoting axis 3 is fitted on chassis 2 through plates 6 provided with an opening to allow the passage of axis 3, while pins 7 passing through corresponding eyelets are provided to hold axis 3 in the housings of plates 6.

In addition, an abutment 8 is provided on chassis 2 at the opposite side of pivoting axis 3, so as to support hopper 1 when in loading position and thus to avoid an overhang and a constant stress on the jack.

Chassis 2 is assembled on tractor 9 through pillars 10, chassis 2 being placed in such way as pivoting axis 3 be set on a lateral side of the tractor.

Owing to this arrangement, many advantages are gained and, in particular, those described hereunder:

The hopper can be placed at a convenient height comparatively low since the emptying is made from the upper level of the hopper;

The elevator or loading spout 11 of the hopper is shortened accordingly, as well as the hopper holders 10, which results in a lighter unit, though more sturdy;

Chassis 2 and holders 10 of hopper 1 are simple and comparatively light since the hopper rotates over itself which eliminates all mechanical troubles;

The hopper is located at the optimal place to allow that the coupling tractor-hopper, and eventually carried or half-trailed machine, be worked out according to the best equilibrium; and The emptying is made in a trailer or in a tip against which the tractor pulls up without any particular maneuver and starts again which saves time and fatigue.

According to the invention, actuator or jack 4, which is fed under pressure by a compressor through pipes 12, is connected to the hopper by its rod $4_1$ through a link or arm 13 pivoting at point 14 on the hopper.

At jointed coupling 15 of arm 13 and of rod $4_1$ of jack 4, is also a jointed arm 16 pivoting at point 17 on chassis 2.

This arrangement allows the control of the tilting of hopper 1 by jack 4 while maintaining the jack and arm 13 at a correct angle so as to avoid the inversion of their angular position.

Moreover, and according to the invention, arm or link 16 is preferably bent or generally shaped in such way that, when the hopper is emptied, this arm 16 will not hinder the tilting of the hopper (see FIG. 3).

Furthermore, the unloading edge of hopper 1 is, preferably fitted with an extension piece 18 serving to convey the dumped products in the trailer or the tip stationed on the side of the tractor.

According to the invention, (see FIGS. 2 and 4), means of spacing of the elevator or loading spout or chute 11 are provided, when hopper 1 is tilted.

As a matter of fact, when in loading position, spout 11 comes by its upper part above the hopper, which would hinder its tilting.

According to the invention, hopper 1 is fitted with two guide plates 19 and 20 between which is housed roller 21 placed at the end of a bent or angularly shaped lever 22 jointed at point 23 on chassis 2.

On lever 22 is also jointed an arm 24 which bears at its ends rollers 25 and 26 taking rest on the bottom of spout 11.

On arm 24 is also fitted a bail 27 or a similar part which surrounds spout 11 and holds it against rollers 25 and 26, while allowing its sliding.

Thus, when the hopper is in loading position (see FIG. 1), spout 11 comes above hopper 1 by its edge $11_1$; while roller 21 comes between the two guiding plates 19 and 20.

When the driver operates the feeding of the jack 4, hopper 1 revolves around axis 3 and roller 21 is pushed back by lower guide plate 19, which makes spout 11 move backwards through arm 22 which revolves at point 23.

In the course of this backward movement, spout 11 which revolves at its lower end moves into bail 27 in rolling over rollers 25 and 26 so as to obtain at the end of the stroke a layout similar to the one shown by FIG. 4 on which hopper 1 is entirely tilted, while spout 11 is drawn aside from the hopper.

When the driver operates the opposite way, hopper 1 moves back into chassis 2 and, in the course of this operation, guiding plate 20 comes in contact with roller 21 and draws it in direction of the hopper in tilting lever 22. This, as a result, moves back spout 11 against hopper 1 according to a way opposite to that described above.

Thus, an automatic clearance and setting of the spout over the hopper is obtained.

We claim:

1. In combination, a tractor, a framework attached to said tractor extending upwardly therefrom, a shaft on the upper portion of said framework disposed laterally to one side of said tractor and extending longitudinally thereof, a hopper pivotally supported at one side thereof on said shaft, a pair of pivotally connected links, one of said links being connected to said hopper and the other of said links being pivotally connected to said framework, an actuator connected between said framework and the pivot point between said links, actuation of said actuator causing said hopper to pivot between a load receiving and a load dumping position, a loading chute for said hopper, means on said chute and said hopper causing said chute to move away from said hopper upon tilting of said hopper to a dumping position, said last-named means comprising an angularly shaped lever having pivotal connection with said chute and said framework at one end thereof, said means on said hopper comprising spaced apart guide plates adapted to receive said roller means, whereby upon tilting of said hopper, said guide plates engage and disengage said roller means to pivot said lever to move said chute toward or away from said hopper.